United States Patent
Watanabe et al.

(10) Patent No.: US 11,221,629 B2
(45) Date of Patent: Jan. 11, 2022

(54) AUTONOMOUS TRAVELER AND TRAVEL CONTROL METHOD THEREOF

(71) Applicant: TOSHIBA LIFESTYLE PRODUCTS & SERVICES CORPORATION, Kawasaki (JP)

(72) Inventors: Kota Watanabe, Seto (JP); Hirokazu Izawa, Aisai (JP); Yuuki Marutani, Nagakute (JP)

(73) Assignee: TOSHIBA LIFESTYLE PRODUCTS & SERVICES CORPORATION, Kawasaki (JP)

( * ) Notice: Subject to any disclaimer, the term of this patent is extended or adjusted under 35 U.S.C. 154(b) by 316 days.

(21) Appl. No.: 16/346,718

(22) PCT Filed: Jun. 7, 2017

(86) PCT No.: PCT/JP2017/021219
§ 371 (c)(1),
(2) Date: May 1, 2019

(87) PCT Pub. No.: WO2018/087951
PCT Pub. Date: May 17, 2018

(65) Prior Publication Data
US 2019/0302796 A1   Oct. 3, 2019

(30) Foreign Application Priority Data
Nov. 9, 2016  (JP) .............................. JP2016-219123

(51) Int. Cl.
G05D 1/02   (2020.01)
A47L 11/40   (2006.01)
A47L 9/28   (2006.01)

(52) U.S. Cl.
CPC .............. *G05D 1/0274* (2013.01); *A47L 9/28* (2013.01); *A47L 11/4061* (2013.01);
(Continued)

(58) Field of Classification Search
CPC .. G05D 1/0274; G05D 1/0251; G05D 1/0238; G05D 2201/0203;
(Continued)

(56) References Cited

U.S. PATENT DOCUMENTS 5,107,946 A    4/1992  Kamimura et al.
6,247,538 B1 *  6/2001  Takeda .................... E02F 3/842
                                             172/2
(Continued)

FOREIGN PATENT DOCUMENTS

CN   101480795 A    7/2009
CN   102083352 B    10/2014
(Continued)

OTHER PUBLICATIONS

International Search Report dated Aug. 8, 2017 in PCT/JP2017/021219 filed on Jun. 7, 2017.

*Primary Examiner* — Bao Long T Nguyen
(74) *Attorney, Agent, or Firm* — Oblon, McClelland, Maier & Neustadt, L.L.P.

(57) ABSTRACT

A vacuum cleaner that can achieve efficient and accurate autonomous traveling. An obstacle detection part detects an object corresponding to an obstacle outside a main casing. A map generation part generates a map indicating information on an area having been traveled by the main casing, based on detection of the object by the obstacle detection part and a self-position estimated by a self-position estimation part during traveling of the main casing. A controller controls an operation of a driving wheel to make the main casing autonomously travel. The controller includes a traveling mode for controlling the operation of the driving wheel so as to make the main casing autonomously travel along a traveling route set based on the map. The controller determines whether or not to change the traveling route for next (Continued)

time based on the obstacle detected by the obstacle detection part during the traveling mode.

21 Claims, 9 Drawing Sheets

(52) U.S. Cl.
CPC ......... G05D 1/0238 (2013.01); G05D 1/0251 (2013.01); *A47L 2201/04* (2013.01); *G05D 2201/0203* (2013.01); *G05D 2201/0215* (2013.01)

(58) Field of Classification Search
CPC ............. G05D 2201/0215; G05D 1/02; G05B 2219/39091; G05B 2219/39093; G05B 2219/40475; G05B 2219/40477; G05B 2219/31005; G05B 2219/31007; A47L 9/28; A47L 11/4061; A47L 2201/04
See application file for complete search history.

(56) References Cited

U.S. PATENT DOCUMENTS

| | | |
|---|---|---|
| 8,452,450 B2 | 5/2013 | Dooley et al. |
| 8,705,842 B2 | 4/2014 | Lee et al. |
| 8,744,665 B2 | 6/2014 | Shin et al. |
| 8,949,016 B1* | 2/2015 | Ferguson .............. G05D 1/0274 701/301 |
| 9,725,012 B2 | 8/2017 | Romanov et al. |
| 9,725,013 B2 | 8/2017 | Romanov et al. |
| 2005/0022273 A1* | 1/2005 | Maeki .................... G05D 1/028 701/300 |
| 2009/0182464 A1 | 7/2009 | Myeong et al. |
| 2009/0281661 A1 | 11/2009 | Dooley et al. |
| 2011/0153081 A1 | 6/2011 | Romanov et al. |
| 2011/0160903 A1 | 6/2011 | Romanov et al. |
| 2012/0106829 A1 | 5/2012 | Lee et al. |
| 2012/0191287 A1 | 7/2012 | Shin et al. |
| 2014/0230179 A1 | 8/2014 | Matsubara et al. |
| 2017/0297455 A1 | 10/2017 | Romanov et al. |

FOREIGN PATENT DOCUMENTS

| | | |
|---|---|---|
| CN | 102596517 B | 6/2015 |
| CN | 103054522 B | 7/2015 |
| CN | 102018481 B | 1/2016 |
| CN | 103431812 B | 4/2016 |
| CN | 103353758 B | 6/2016 |
| JP | 3-73004 A | 3/1991 |
| JP | 2004-33340 A | 2/2004 |
| JP | 2007-323402 A | 12/2007 |
| JP | 2008-129614 A | 6/2008 |
| JP | 2012-96028 A | 5/2012 |
| JP | 2017-143983 A | 8/2017 |
| TW | 201320948 A1 | 6/2013 |
| TW | 201520717 A | 6/2015 |

* cited by examiner

|  |  | DETECTION FREQUENCY | WHETHER TO CHANGE TRAVELING ROUTE |
|---|---|---|---|
| MONDAY | MORNING TIME (6:00~12:00) | 0 | NOT TO CHANGE |
|  | DAYTIME (12:00~18:00) | 3 | TO CHANGE |
|  | NIGHTTIME (18:00~6:00) | 2 | TO CHANGE |
| TUESDAY | MORNING TIME (6:00~12:00) | 3 | TO CHANGE |
|  | DAYTIME (12:00~18:00) | 1 | NOT TO CHANGE |
|  | NIGHTTIME (18:00~6:00) | 0 | NOT TO CHANGE |
| ⋮ |

FIG. 11

AUTONOMOUS TRAVELER AND TRAVEL CONTROL METHOD THEREOF

CROSS REFERENCE TO RELATED APPLICATIONS

The present application is a National Stage Application of PCT/JP2017/021219 filed on Jun. 7, 2017. The PCT application acclaims priority to Japanese Patent Application No. 2016-219123 filed on Nov. 9, 2016. All of the above applications are herein incorporated by reference.

FIELD

Embodiments described herein relate generally to an autonomous traveler which generates a map indicating the information on the area having been traveled and travel control method for the autonomous traveler.

BACKGROUND

Conventionally, a so-called autonomous-traveling type vacuum cleaner (cleaning robot) which cleans a floor surface as a cleaning-object surface while autonomously traveling on the floor surface has been known.

In a technology to perform efficient cleaning by such a vacuum cleaner, a map which reflects the size and shape of a room to be cleaned, obstacles and the like is generated (through mapping), an optimum traveling route is set based on the generated map, and then traveling is performed along the traveling route. However, in generation of a map, the interior or the material of, for example, furniture, a floor surface or the like inside a room, or the shape of an obstacle, for example, a toy, cord or the like is not taken into consideration. Accordingly, in some case, such a vacuum cleaner may not travel nor perform cleaning along an expected traveling route due to the repetition of the operation for avoiding an obstacle or the like, or may get stuck due to floating or the like by obstacle collision or a step gap on a floor.

In addition, the layout inside a room may not always be the same, and arrangement of obstacles or the like may be changed compared to that at the time of creation of a map. Accordingly, if a traveling route is set only based on a stored map, there is a risk that traveling may be disturbed by an obstacle not shown on the map or the like. Therefore, it is considered that, in the case where an obstacle not shown on the map is newly detected, the map is changed according to the detection and the traveling route for the next time and thereafter is set based on the changed map.

On the other hand, in an example, in the case where a shopping bag or baggage not placed usually, a pet, a resident or the like, is detected as an obstacle, if a map is changed according to such detection, the traveling route for the next time may become a route different from the actually optimum route.

CITATION LIST

Patent Literature

PTL 1: Japanese Laid-open Patent Publication No. 2012-96028

SUMMARY OF INVENTION

Technical Problem

The technical problem of the present invention is to provide an autonomous traveler capable of achieving efficient and accurate autonomous traveling, and travel control method for the autonomous traveler.

Solution to Problem

The autonomous traveler in each of the embodiments includes a main casing, a driving wheel, a self-position estimator, an obstacle detector, a map generator and a controller. The driving wheel enables the main casing to travel. The self-position estimator estimates a self-position. The obstacle detector detects an obstacle outside the main casing. The map generator generates a map indicating information on an area having been traveled by the main casing, based on detection of the obstacle by the obstacle detector and the self-position estimated by the self-position estimator during traveling of the main casing. The controller controls an operation of the driving wheel to make the main casing autonomously travel. Also, the controller includes a traveling mode for controlling the operation of the driving wheel so as to make the main casing autonomously travel along a traveling route set based on the map. Then, the controller determines whether or not to change the traveling route for next time based on the obstacle detected by the obstacle detector during the traveling mode.

BRIEF DESCRIPTION OF DRAWINGS

FIG. 11 is a table indicating relation among time information of an autonomous traveler, detection frequency and whether or not to change a traveling route according to a second embodiment.

DESCRIPTION OF EMBODIMENT

Hereinbelow, the configuration of a first embodiment will be described with reference to the drawings.

Figure 1:
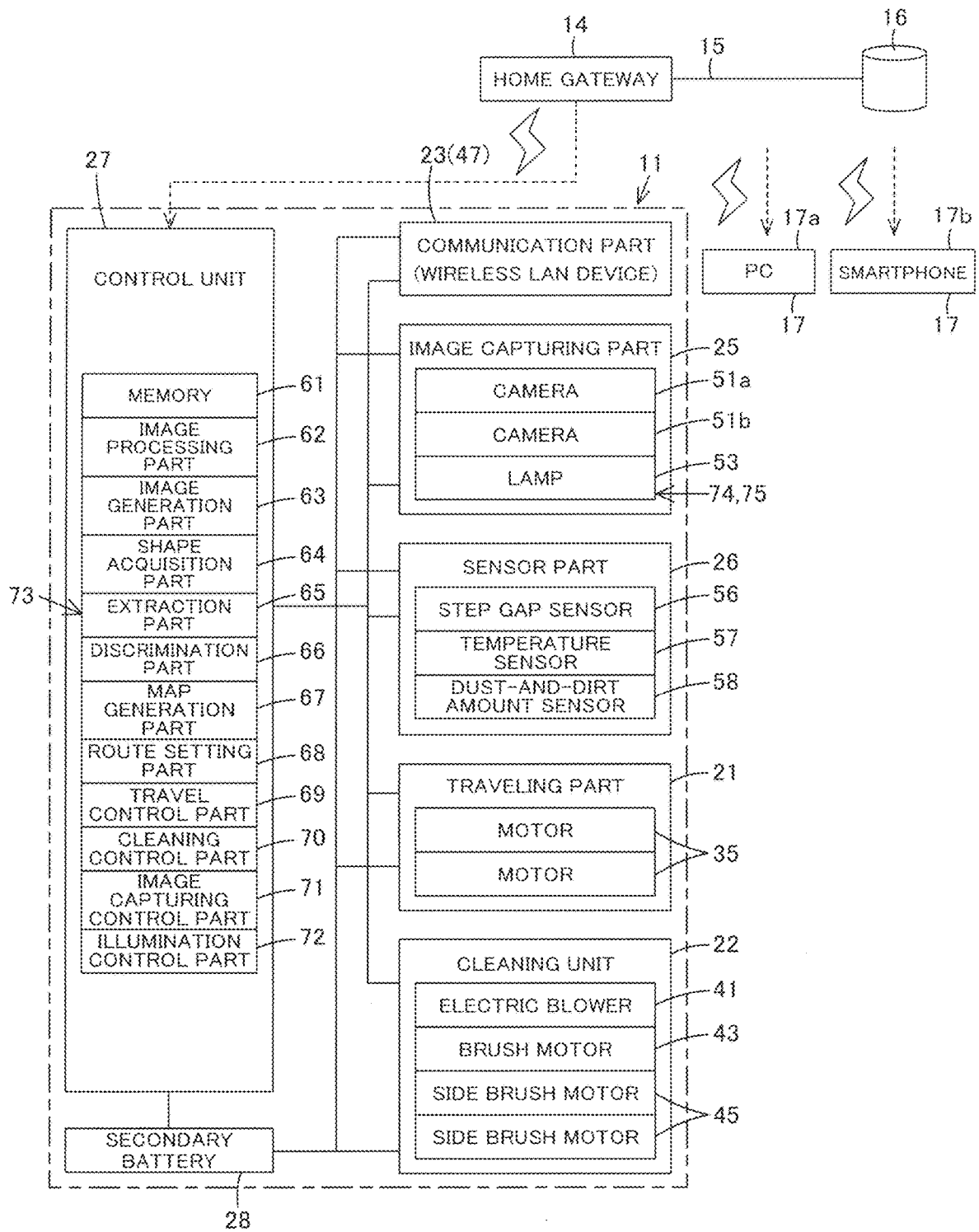
FIG. 1 is a block diagram showing an internal configuration of an autonomous traveler according to a first embodiment.

In FIG. 1 to FIG. 5, reference sign 11 denotes a vacuum cleaner as an autonomous traveler, and this vacuum cleaner 11 constitutes a vacuum cleaning apparatus (vacuum cleaner system) as an autonomous traveler device in combination with a charging device (charging table) 12 (FIG. 5) as a station device serving as a base station for charging the vacuum cleaner 11. Then, the vacuum cleaner 11 is, in the present embodiment, a so-called self-propelled robot cleaner (cleaning robot) which cleans a floor surface that is a cleaning-object surface as a traveling surface while autonomously traveling (self-propelled traveling) on the floor surface. For example, as shown in FIG. 1, the vacuum cleaner 11 is enabled to perform wired or wireless communication with a general-purpose server 16 as data storage means (a data storage part) and a general-purpose external device 17 as indication means (an indication part) via an (external) network 15 such as the Internet, by performing communication (signal transmission and reception) with a home gateway (router) 14 as relay means (a relay part) disposed in a cleaning area or the like by use of wired communication or wireless communication such as Wi-Fi (registered trademark) or Bluetooth (registered trademark).

Figure 2:
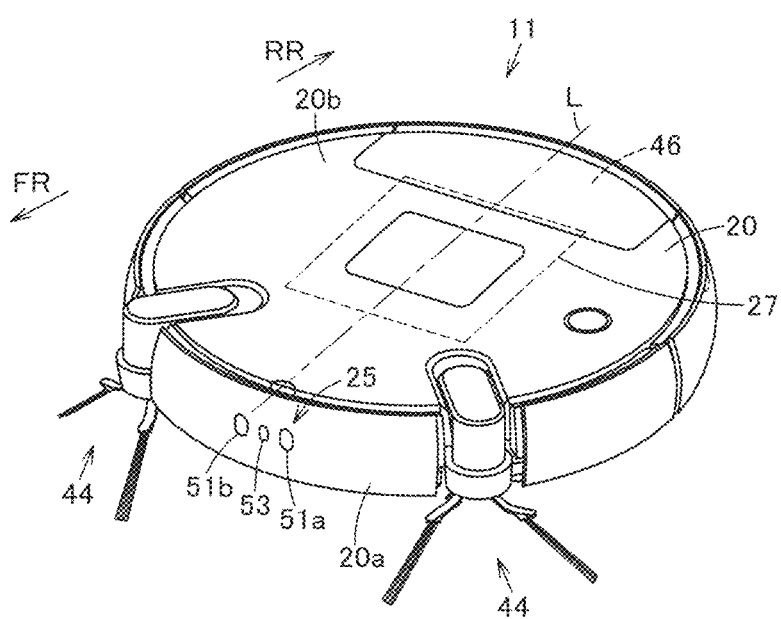
FIG. 2 is a perspective view showing the above autonomous traveler.

Further, the vacuum cleaner 11 includes a hollow main casing 20 (FIG. 2). The vacuum cleaner 11 includes a traveling part 21. The vacuum cleaner 11 also includes a cleaning unit 22 for cleaning dust and dirt on a floor surface and the like. The vacuum cleaner 11 further includes a communication part for performing communication with an external device including the charging device 12. The vacuum cleaner 11 also includes an image capturing part 25 for capturing images. The vacuum cleaner 11 further includes a control unit 27 as control means which is a controller. The vacuum cleaner 11 also includes a secondary battery 28 which is a battery. In addition, the following description will be given on the assumption that a direction extending along the traveling direction of the vacuum cleaner 11 (main casing 20) is assumed as a back-and-forth direction (directions of arrows FR and RR shown in FIG. 2), while a left-and-right direction (directions toward both sides) intersecting (orthogonally crossing) the back-and-forth direction is assumed as a widthwise direction.

Figure 3:
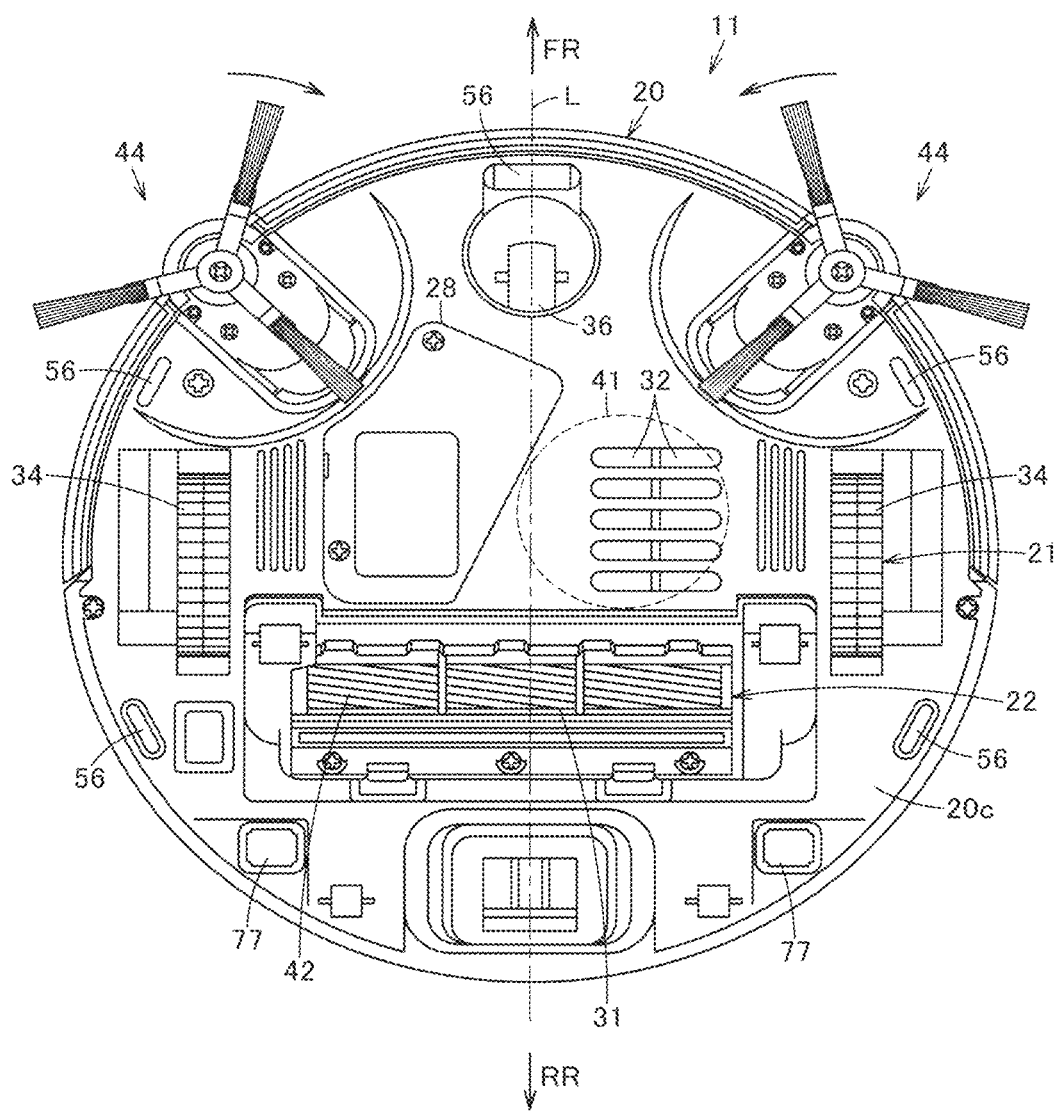
FIG. 3 is a plan view showing the above autonomous traveler as viewed from below.
Figure 4:
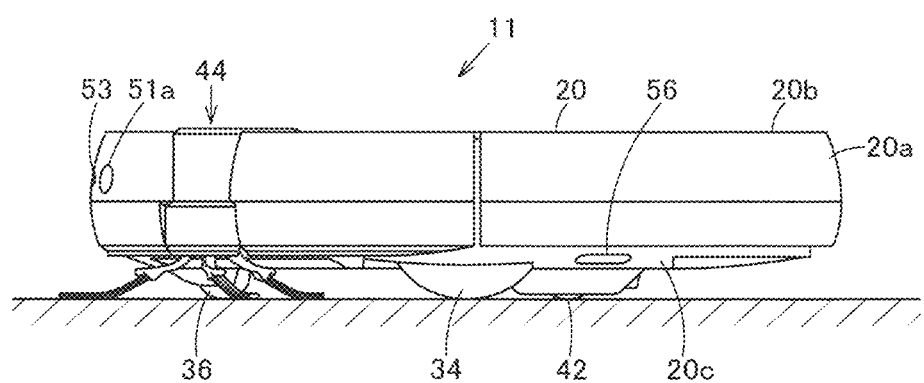
FIG. 4 is a side view showing the above autonomous traveler.

The main casing 20 shown in FIG. 2 to FIG. 4 is formed into a flat columnar shape (disc shape) or the like from a synthetic resin, for example. That is, the main casing 20 includes a side surface portion 20a (FIG. 2), and an upper surface portion 20b (FIG. 2) and a lower surface portion 20c (FIG. 3) continuing from an upper portion and a lower portion of the side surface portion 20a, respectively. The side surface portion 20a of the main casing 20 is formed substantially in a cylindrical-surface shape, and includes, for example, the image capturing part 25 or the like. Also the upper surface portion 20b and the lower surface portion 20c of the main casing 20 are each formed substantially in a circular shape. As shown in FIG. 3, on the lower surface portion 20c facing the floor surface, a suction port 31 serving as a dust collecting port, an exhaust port 32 and the like are opened respectively.

The traveling part 21 makes the main casing 20 travel on the floor surface. The traveling part 21 includes driving wheels 34, 34 as a plurality (pair) of driving parts. The traveling part 21 also includes motors 35, 35 (FIG. 1) each of which is driving means as an operating part. The traveling part 21 may further include a swing wheel 36 for swinging use, or the like.

The each driving wheel 34 makes the vacuum cleaner 11 (main casing 20) travel (autonomously travel) in an advancing direction and a retreating direction on the floor surface, that is, serves for traveling use, and the driving wheels 34 each of which has an unshown rotational axis extending along the left-and-right widthwise direction are disposed symmetrical to each other in the widthwise direction.

The each motor 35 (FIG. 1) serves to drive each of the driving wheels 34, 34. The each motor 35 (FIG. 1) is disposed, for example, in correspondence with the each driving wheel 34, and is capable of driving the each driving wheel 34 independently.

The swing wheel 36, which is positioned at a front portion and a substantially central portion in the widthwise direction of the lower surface portion 20c of the main casing 20, is a driven wheel swingable along the floor surface.

The cleaning unit 22 includes, for example, an electric blower 41 which is positioned inside the main casing 20 to suck dust and dirt along with air through the suction port 31 and discharge exhaust air through the exhaust port 32, a rotary brush 42 as a rotary cleaner which is rotatably attached to the suction port 31 to scrape up dust and dirt, as well as a brush motor 43 (FIG. 1) which rotationally drives the rotary brush 42, a side brush 44 which is auxiliary cleaning means (an auxiliary cleaning part) as a swinging-cleaning part rotatably attached on both sides of the main casing 20 on its front side or the like to scrape together dust and dirt, as well as a side brush motor 45 (FIG. 1) which drives the side brush 44, a dust-collecting unit 46 (FIG. 2) which communicates with the suction port 31 to accumulate dust and dirt, and the like. In addition, with respect to the electric blower 41, the rotary brush 42 as well as the brush motor 43 (FIG. 1), and the side brush 44 as well as the side brush motor 45 (FIG. 1), it is sufficient that at least any one of these members is included.

The communication part 23 shown in FIG. 1 may include, for example, a wireless LAN device 47 which is wireless communication means (a wireless communication part) for performing wireless communication with the external device 17 via the home gateway 14 and the network 15 and reporting means (a reporting part) serving as cleaner signal receiving means (a cleaner signal receiving part). The communication part 23 may also include unshown transmission means (a transmission part), for example, an infrared emitting element or the like for transmitting wireless signals (infrared signals) to, for example, the charging device 12 (FIG. 5) or the like. The communication part 23 may further include unshown receiving means (a receiving part) or the like, for example, a phototransistor or the like for receiving wireless signals (infrared signals) from, for example, the charging device 12, an unshown remote control or the like. In addition, in an example, the communication part 23 may have an access point function to be used to perform wireless communication directly with the external device 17 not via the home gateway 14. In an example, a web server function may also be added to the communication part 23.

The wireless LAN device 47 serves to transmit and receive various types of information with the network 15 from the vacuum cleaner 11 via the home gateway 14.

The image capturing part 25 includes a plurality of cameras 51a, 51b, as, for example, one and the other image capturing means (image-capturing-part main bodies), and a lamp 53, such as an LED, as illumination means (an illumination part) for giving illumination for these cameras 51a, 51b.

As shown in FIG. 2, the cameras 51a, 51b are disposed on both sides of the front portion of the side surface portion 20a of the main casing 20. That is, in the present embodiment, the cameras Ma, Mb are disposed on the side surface portion 20a of the main casing 20 at positions which are skewed by a substantially equal specified angle (acute angle) in the left-and-right direction with respect to a widthwise center line L of the vacuum cleaner 11 (main casing 20), respectively. In other words, these cameras 51a, 51b are disposed substantially symmetrically in the widthwise direction with respect to the main casing 20, and the central position between these cameras Ma, Mb is substantially coincident with the central position of the widthwise direction intersecting (orthogonally crossing) the back-and-forth direction which is the traveling direction of the vacuum cleaner 11 (main casing 20). Further, these cameras 51a, 51b are disposed at substantially equal positions in the up-and-down direction, that is, substantially equal height positions respectively. Therefore, these cameras 51a, 51b are set substantially equal to each other in height from a floor surface in the state where the vacuum cleaner 11 is set on the floor surface. Accordingly, the cameras 51a, 51b are disposed at separated and mutually shifted positions (positions shifted in the left-and-right direction). Also, the cameras 51a, 51b are digital cameras which capture digital images of a forward direction which is the traveling direction of the main casing 20, at specified horizontal angles of view (for example 105° or the like) and at specified time intervals, for example at a micro-time basis such as several tens of milliseconds or the like, or at a several-second basis or the like. Further, these cameras 51a, 51b have their image capturing ranges (fields of view) Va, Vb overlapping with each other (FIG. 6), so that (one and the other) images P1, P2 (FIG. 7A and FIG. 7B) captured by these cameras 51a, 51b overlap with each other in the left-and-right direction at a region in which their image capturing regions contain a forward position resulting from extending the widthwise center line L of the vacuum cleaner 11 (main casing 20). In the present embodiment, the cameras 51a, 51b are so designed to capture color images of a visible light region, for example. In addition, images captured by the cameras 51a, 51b may be compressed into a specified data format by, for example, an unshown image processing circuit or the like.

The lamp 53 serves to emit illuminating light for image capturing by the cameras 51a, 51b, and is disposed at an intermediate position between the cameras 51a, 51b, that is, at a position on the center line L of the side surface portion 20a of the main casing 20. That is, the lamp 53 is distanced substantially equally from the cameras 51a, 51b. The lamp 53 is disposed also at a substantially equal position in the up-and-down direction, that is, a substantially equal height position, with respect to the cameras 51a, 51b. Accordingly, the lamp 53 is disposed at a substantially central portion in the widthwise direction between the cameras 51a, 51b. In the present embodiment, the lamp 53 serves to emit light containing the visible light region. Alternatively, the lamp 53 may be set for each of the cameras 51a, 51b.

A sensor part 26 shown in FIG. 1 may include, for example, a step gap sensor (step gap detection means (a step gap detection part)) 56. The sensor part 26 may also include, for example, a temperature sensor (temperature detection means (a temperature detection part)) 57. Further, the sensor part 26 may include, for example, a dust-and-dirt amount sensor (dust-and-dirt amount detection means (a dust-and-dirt amount detection part)) 58. In addition, the sensor part 26 may include, for example, a rotational speed sensor such as an optical encoder for detecting rotational speed of the each driving wheel 34 (each motor 35) to detect a swing angle or progressional distance of the vacuum cleaner 11 (main casing (FIG. 2)). The sensor part 26 may also include a non-contact-type obstacle sensor for detecting an obstacle by use of ultrasonic waves, infrared rays or the like. The sensor part 26 may further include a contact-type obstacle sensor for detecting an obstacle by contacting with the obstacle, or the like. The rotational speed sensor, the obstacle sensor or the like is not an essential constituent component.

The step gap sensor 56 is a non-contact sensor, for example, an infrared sensor, an ultrasonic sensor or the like. A distance sensor serves as the step gap sensor 56, which emits infrared rays or ultrasonic waves to an object to be detected, (in the present embodiment, emitting to a floor surface), and then receives the reflection waves from the object to be detected to detect a distance between the object to be detected and the step gap sensor 56 based on time difference between the transmission and the reception. That is, the step gap sensor 56 detects a distance between the step gap sensor 56 (the position at which the step gap sensor 56 is disposed) and the floor surface to detect a step gap on the floor surface. As shown in FIG. 3, the step gap sensor 56 is disposed on the lower surface portion 20c of the main casing 20. In the present embodiment, the step gap sensor 56 is disposed, for example, respectively in the front and the rear of the driving wheels 34, 34 and in the front portion of the swing wheel 36 (the front lower surface portion of the main casing 20).

For example, a non-contact sensor or the like serves as the temperature sensor 57 shown in FIG. 1, which detects a temperature of an object to be detected by detecting infrared rays emitted from the object to be detected. The temperature sensor 57 which is disposed, for example, on the side surface portion 20a, the upper surface portion 20b or the like of the main casing 20 (FIG. 2) serves to detect a temperature of an object to be detected in the forward direction of the main casing 20 (FIG. 2). In addition, the temperature sensor 57 may serve to detect a temperature based on, for example, infrared images captured by the cameras 51a, 51b.

As the dust-and-dirt amount sensor 58, for example, an optical sensor or the like is used, which includes a light emitting part and a light receiving part disposed inside the air path communicating from the suction port 31 (FIG. 3) to the dust-collecting unit 46 (FIG. 2), to detect the amount of dust and dirt based on increase and decrease of the light amount received at the light receiving part with respect to the light emitted from the light emitting part depending on the amount of dust and dirt going through the air path. In addition, instead of the dust-and-dirt amount sensor 58, for example, dust-and-dirt amount detection means (a dust-and-dirt amount detection part (a dust-and-dirt amount sensor)) may be included, which detects minute visible dust and dirt on a floor surface based on images captured by the cameras 51a, 51b.

Figure 5:
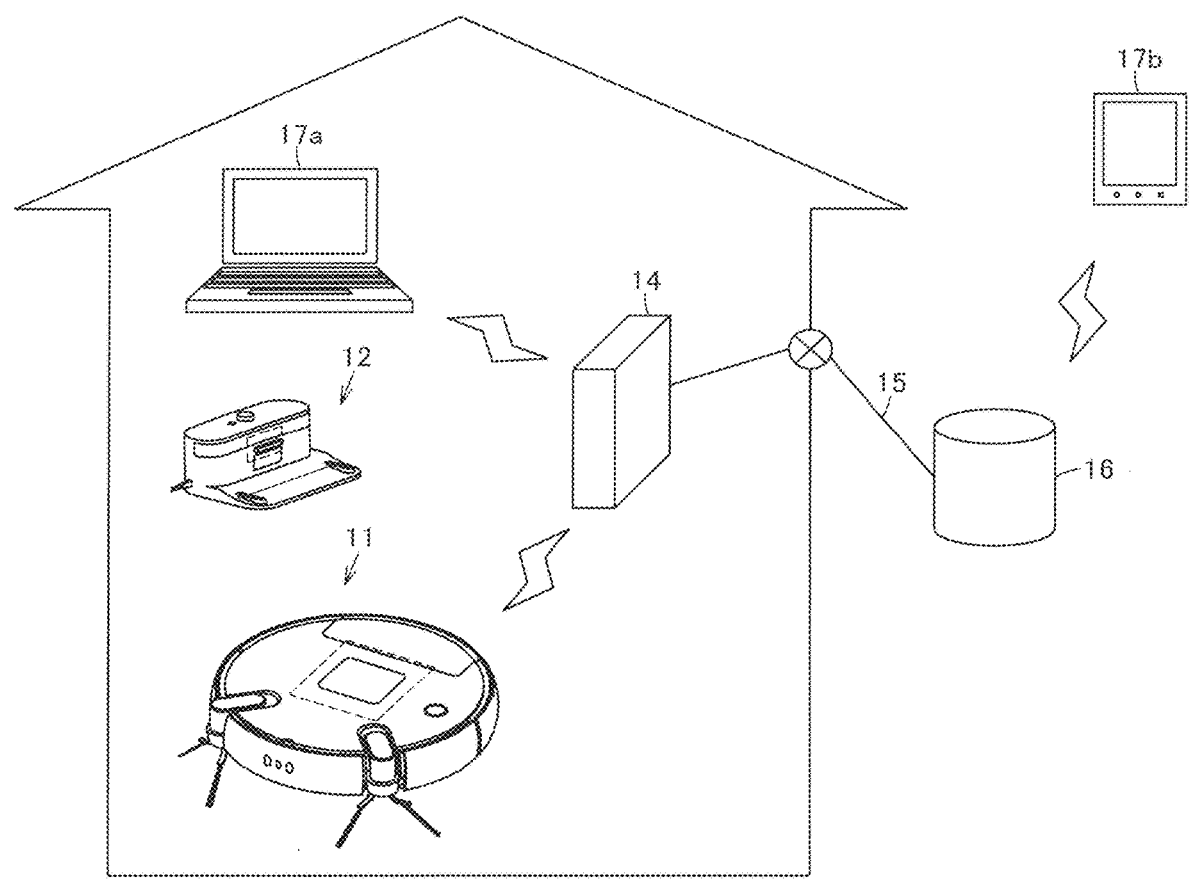
FIG. 5 is an explanatory view schematically showing an autonomous traveler system including the above autonomous traveler.

Then, the control unit 27 shown in FIG. 1 serves to control the traveling part 21, the cleaning unit 22, the communication part 23, the image capturing part 25, and the like. The control unit 27 is a microcomputer including, for example, a CPU which is a control means main body (control unit main body), a ROM which is a storage part in which fixed data such as programs to be read by the CPU are stored, a RAM which is an area storage part for dynamically forming various memory areas such as a work area serving as a working region for data processing by programs or the like (each of which is not shown in the figure). The control unit 27 further includes, for example, a memory 61 as storage means (a storage section). The control unit 27 also includes, for example, an image processing part 62. The control unit 27 also includes, for example, an image generation part 63 as distance image generation means (a distance image generation part). The control unit 27 further includes, for example, a shape acquisition part 64 which is shape acquisition means. The control unit 27 also includes, for example, an extraction part 65 which is extraction means. The control unit 27 further includes, for example, a discrimination part 66 as discrimination means. The control unit 27 also includes, for example, a map generation part 67 which is map generation means for generating a map for traveling use. The control unit 27 further includes, for example, a route setting part 68 for setting a traveling route based on a map. The control unit 27 may also include, for example, a travel control part 69. Further, the control unit 27 may include, for example, a cleaning control part 70. The control unit 27 may also include, for example, an image capturing control part 71. The control unit 27 may also include, for example, an illumination control part 72. Then, the control unit 27 includes, for example, a traveling mode for driving the driving wheels 34, 34 (FIG. 3), that is, the motors 35, 35, to make the vacuum cleaner 11 (main casing 20 (FIG. 2)) autonomously travel. The control unit 27 may also include a charging mode for charging the secondary battery 28 via the charging device 12 (FIG. 5). The control unit 27 may further include a standby mode applied during a standby state.

The memory 61 is capable of storing, for example, data of images captured by the cameras 51*a*, 51*b*. The memory 61 may store threshold values to be used by, for example, the discrimination part 66 or the like. The memory 61 may also store various types of data, for example, a map generated by the map generation part 67, and the like. A non-volatile memory, for example, a flash memory or the like, is used as the memory 61, which holds various types of stored data regardless of whether the vacuum cleaner 11 is powered on or off.

The image processing part 62 performs image processing such as correction of lens distortion, contrast adjusting or the like of images captured by the cameras 51*a*, 51*b*. The image processing part 62 is not an essential component.

The image generation part 63 calculates a distance (depth) of an object (feature points) based on the distance between the cameras 51*a*, 51*b* and images captured by the cameras 51*a*, 51*b*, (in the present embodiment, images captured by the cameras 51*a*, 51*b* and then processed by the image processing part 62), and also generates a distance image (parallax image) indicating the calculated distance to the object (feature points), using known methods. That is, the image generation part 63 applies triangulation based on a distance from the cameras 51*a*, 51*b* to an object (feature points) O and the distance between the cameras 51*a*, 51*b* (FIG. 6), detects pixel dots indicative of identical positions in individual images captured by the cameras 51*a*, 51*b* (images processed by the image processing part 62), and calculates angles of the pixel dots in the up-and-down direction and the left-and-right direction to calculate a distance of that position from the cameras 51*a*, 51*b* based on those angles and the distance between the cameras 51*a*, 51*b*. Therefore, it is preferable that images captured by the cameras 51*a*, 51*b* overlap with each other in some ranges as much as possible. Further, the distance image is generated by the image generation part 63 through displaying of calculated pixel-dot-basis distances that are converted into visually discernible gradation levels such as brightness, color tone or the like on a specified dot basis, for example, a one-dot basis or the like. In the present embodiment, the image generation part 63 generates a distance image which is a black-and-white image whose brightness decreases more and more with increase of a distance, that is, as a gray-scale image of 256 levels ($=2^8$ with 8 bits) as an example which increases in blackness with increasing distance and increases in whiteness with decrease of a distance in a forward direction from the vacuum cleaner 11 (main casing 20). Accordingly, the distance image is obtained by, as it were, visualizing a mass of distance information (distance data) of objects positioned within the forward image range captured by the cameras 51*a*, 51*b* in the traveling direction of the vacuum cleaner 11 (main casing 20). In addition, the image generation part 63 may generate a distance image only with regard to the pixel dots within a specified image range in each of images captured by the cameras 51*a*, 51*b*, or may generate a distance image showing the entire images.

Figure 6:
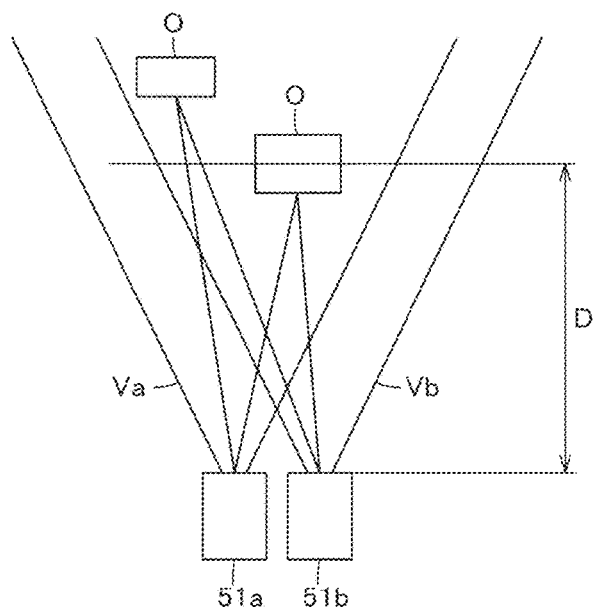
FIG. 6 is an explanatory view schematically showing a method for calculating a distance to an object by the above autonomous traveler.
Figure 7A:
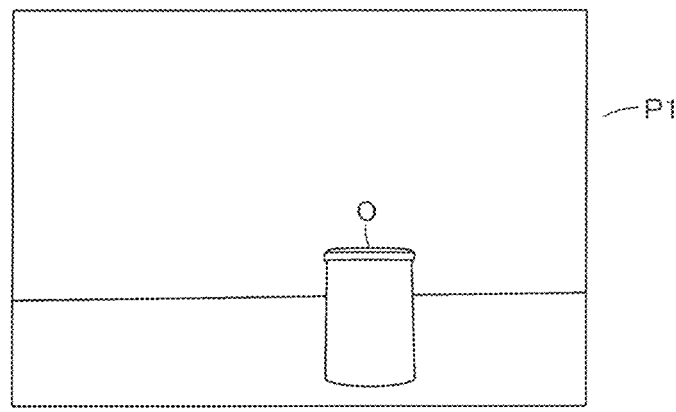
FIG. 7A is an explanatory view showing an example of an image captured by one camera.
Figure 7B:
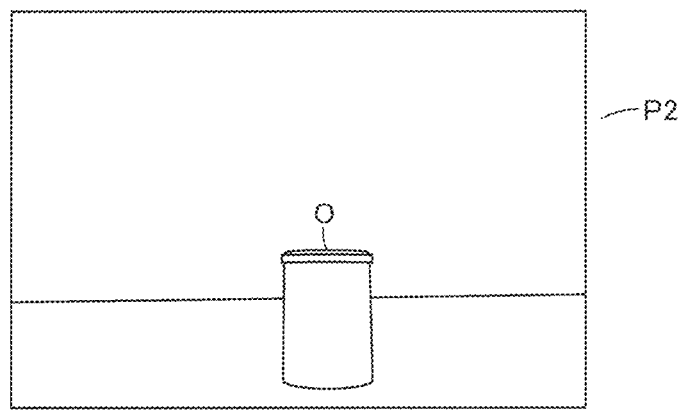
FIG. 7B is an explanatory view showing an example of an image captured by the other camera.
Figure 7C:
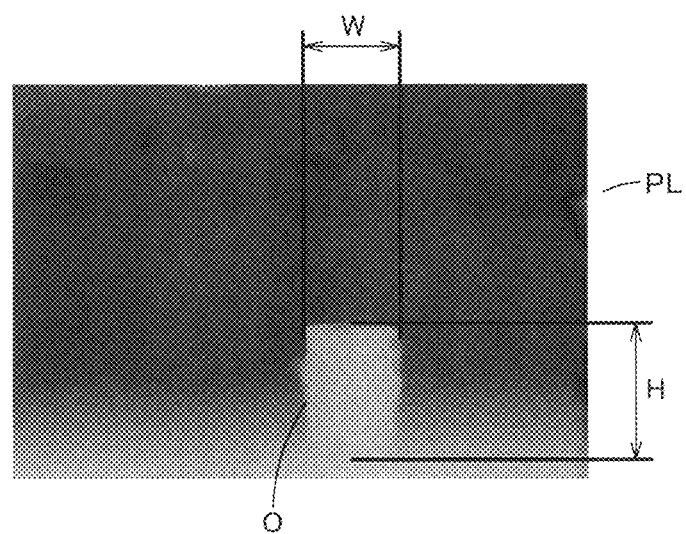
FIG. 7C is an explanatory view showing an example of a distance image generated based on FIG. 7A and FIG. 7B.

The shape acquisition part 64 acquires shape information on an object in images captured by the cameras Ma, Mb. That is, the shape acquisition part 64 acquires shape information on an object O positioned at a specified distance D (or in a specified distance range) with respect to the distance image generated by the image generation part 63 (FIG. 6). The shape acquisition part 64 detects a pixel-dot distance at the specified distance (or in the distance range), with respect to the object O, for example an empty can or the like captured in a distance image PL, as one example in the distance image, thereby enabling to detect a horizontal dimension, that is, a width dimension W, and an up-and-down dimension, that is, a height dimension H of the object O (FIG. 7C). Also the shape acquisition part 64 acquires shape information (a width dimension and a height dimension) of an object, thereby enabling also to indirectly acquire shape information (a width dimension and a height dimension) or the like of space and/or a hole part having no existing object.

The extraction part 65 extracts feature points based on images captured by the cameras 51*a*, 51*b*. That is, the extraction part 65 performs feature detection (feature extraction), for example, edge detection or the like, with respect to a distance image generated by the image generation part 63 to extract feature points in the distance image. The feature points are used as reference points when the vacuum cleaner 11 estimates its self-position in a cleaning area. Moreover, any of known methods is available as the edge detection method.

The discrimination part 66 discriminates the information detected by the sensor part 26 (step gap sensor 56, temperature sensor 57, dust-and-dirt amount sensor 58), the shape information on an object positioned at a specified distance (or in a specified distance range) or the shape information on a narrow space or the like positioned between objects acquired by the shape acquisition part 64, the feature points extracted by the extraction part 65, and the information (height, material and color tone) and the like on an object present in images captured by the cameras 51*a*, 51*b* (in the present embodiment, in images processed by the image processing part 62, for example). Based on such discrimination, the discrimination part 66 determines a self-position of the vacuum cleaner 11 and existence of an object corresponding to an obstacle and also determines whether or not to change the travel control and/or the cleaning control of the vacuum cleaner 11 (main casing 20 (FIG. 2)), information to be reflected by the map generation part 67, and the like. Accordingly, a self-position estimation part as self-position estimation means for estimating a self-position of the vacuum cleaner 11 is configured with the cameras 51*a*, 51*b* (image processing part 62), the image generation part 63, the extraction part 65, the discrimination part 66 and the like. An obstacle detection part 74 as obstacle detection means for detecting existence of an obstacle is configured with the sensor part 26 (step gap sensor 56), the cameras 51*a*, 51*b*

(image processing part 62), the image generation part 63, the shape acquisition part 64, the discrimination part 66 and the like. An information acquisition part 75 as information acquisition means for acquiring various types of information on a cleaning area is configured with the sensor part (step gap sensor 56, temperature sensor 57, dust-and-dirt amount sensor 58), the cameras 51*a*, 51*b* (image processing part 62), the image generation part 63, the shape acquisition part 64, the discrimination part 66 and the like.

That is, the self-position estimation part 73 collates feature points stored in a map and the feature points extracted from a distance image by the extraction part 65 to estimate a self-position.

The obstacle detection part 74 detects existence of an object (including a step gap) corresponding to an obstacle, based on whether or not any obstacle exists in a specified image range of the distance image.

The information acquisition part 75 acquires, for example, the step gap information on a floor surface detected by the step gap sensor 56, the temperature information on an object detected by the temperature sensor 57, the amount of dust and dirt on a floor surface detected by the dust-and-dirt amount sensor 58, and the shape of an object such as a height dimension and a width dimension, the material information on a floor surface, the color tone of a floor surface and the like acquired by the shape acquisition part 64.

The map generation part 67 calculates, to generate a map, a positional relation between the cleaning area where the vacuum cleaner 11 (main casing 20 (FIG. 2)) is positioned and an object or the like positioned inside this cleaning area based on the shape information on the object acquired by the shape acquisition part 64 and the position of the vacuum cleaner 11 (main casing 20 (FIG. 2)) estimated by the self-position estimation part 73.

The route setting part 68 sets an optimum traveling route based on the map generated by the map generation part 67, the self-position estimated by the self-position estimation part 73, and the detection frequency of the object corresponding to an obstacle detected by the obstacle detection part 74. Here, as an optimum traveling route to be generated, a route which can provide efficient traveling (cleaning) is set, such as the route which can provide the shortest traveling distance for traveling in an area possible to be cleaned in the map (an area excluding a part where traveling is impossible due to an obstacle, a step gap or the like), for example, the route where the vacuum cleaner 11 (main casing 20 (FIG. 2)) travels straight as long as possible (where directional change is least required), the route where contact with an object corresponding to an obstacle is less, the route where the number of times of redundantly traveling the same location is the minimum, or the like. Further, on the traveling route, a plurality of relay points (sub goals) are set.

The travel control part 69 controls the operation of the motors 35, 35 (driving wheels 34, 34 (FIG. 3)) of the traveling part 21 so as to make the vacuum cleaner 11 (main casing 20) travel along the traveling route set by the route setting part 68. That is, the travel control part 69 controls a magnitude and a direction of current flowing through the motors 35, 35 to rotate the motors 35, 35 in a normal or reverse direction, thereby controlling the operation of the motors 35, 35. By controlling the operation of the motors 35, 35, the travel control part 69 controls the operation of the driving wheels 34, 34 (FIG. 3). In addition, the travel control part 69 is configured to control a traveling direction and/or traveling speed of the vacuum cleaner 11 (main casing 20) based on the discrimination by the discrimination part 66.

The cleaning control part 70 controls the operations of the electric blower 41, the brush motor 43 and the side brush motor 45 of the cleaning unit 22. That is, the cleaning control part 70 controls the conduction amounts of the electric blower 41, the brush motor 43 and the side brush motor 45, independently of one another, to control the operations of the electric blower 41, the brush motor 43 (rotary brush 42 (FIG. 3)) and the side brush motor 45 (side brush 44 (FIG. 3)). Also, the cleaning control part 70 is configured to control the operation of the cleaning unit 22 based on the discrimination by the discrimination part 66. In addition, control units may be provided in correspondence with the electric blower 41, the brush motor 43 and the side brush motor 45, independently and respectively.

The image capturing control part 71 controls the operation of the cameras 51*a*, 51*b* of the image capturing part 25. That is, the image capturing control part 71 includes a control circuit for controlling the operation of shutters of the cameras 51*a*, 51*b*, and makes the shutters operate at specified time intervals to exert control to capture images by the cameras 51*a*, 51*b* at specified time intervals.

The illumination control part 72 controls the operation of the lamp 53 of the image capturing part 25. That is, the illumination control part 72 controls turning-on and -off of the lamp 53 via a switch or the like. The illumination control part 72 in the present embodiment includes a sensor for detecting brightness around the vacuum cleaner 11, and makes the lamp 53 lit when the brightness detected by the sensor is a specified level or lower, and if otherwise, keeps the lamp 53 unlit.

Alternatively, the image capturing control part 71 and the illumination control part 72 may be provided as image capturing control means (an image capturing control part) separately from the control unit 27.

The secondary battery 28 also serves to supply power to the traveling part 21, the cleaning unit 22, the communication part 23, the image capturing part 25, the sensor part 26, the control unit 27, and the like. The secondary battery 28 is electrically connected to, for example, charging terminals 77, 77 serving as connecting parts exposed on both sides of a rear portion on the lower surface portion 20*c* of the main casing 20 shown in FIG. 3. With the charging terminals 77, 77 electrically and mechanically connected to the charging device 12 (FIG. 5) side, the secondary battery 28 is charged via the charging device 12 (FIG. 5).

The home gateway 14 shown in FIG. 1, which is also called an access point or the like, is installed inside a building and connected to the network 15, for example, by wire.

The server 16 is a computer (cloud server) connected to the network 15 and is capable of storing various types of data therein.

The external device 17 is a general-purpose device, for example, a PC (tablet terminal (tablet PC)) 17*a*, a smartphone (mobile phone) 17*b* or the like, which is enabled to make wired or wireless communication with the network 15, for example, via the home gateway 14 inside a building, and also enabled to make wired or wireless communication with the network 15 outside the building. This external device 17 has an indication function for indicating at least an image.

Next, the operation of the above-described one embodiment will be described with reference to the drawings.

In general, the work of a vacuum cleaning apparatus is roughly divided into cleaning work for carrying out cleaning by the vacuum cleaner 11, and charging work for charging the secondary battery 28 with the charging device 12. The charging work is implemented by a known method using a charging circuit, such as a constant current circuit contained in the charging device 12. Accordingly, only the cleaning work will be described. In addition, image capturing work for capturing an image of a specified object by at least one of the cameras 51a, 51b in response to an instruction from the external device 17 or the like may be included separately.

In the vacuum cleaner 11, at a timing of, for example, arrival of a preset cleaning start time or reception of a cleaning-start instruction signal transmitted by a remote control or the external device 17, the control unit 27 is switched over from the standby mode to the traveling mode, and the control unit 27 (travel control part 69) drives the motors 35, 35 (driving wheels 34, 34) to make the vacuum cleaner 11 move from the charging device 12 by a specified distance.

Then, the vacuum cleaner 11 generates a map of the cleaning area by use of the map generation part 67. In generation of the map, in overview, the obstacle detection part 74 acquires whether or not any obstacle exists, and the information acquisition part 75 acquires various types of information, while the control unit 27 (travel control part 69) makes the vacuum cleaner 11 (main casing 20) travel along an outer wall of the cleaning area or the like and/or makes the vacuum cleaner 11 (main casing 20) pivot at the position, so that a map is generated based on the present position of the vacuum cleaner 11 (map generation mode). Then, when the control unit 27 discriminates that the whole cleaning area has been mapped, the map generation mode is finished and switched over to a cleaning mode which will be described later. The map generation mode is selected in the case where the vacuum cleaner 11 is started in the state where the map generation part 67 has not generated any map of the cleaning area (any map is not stored in the memory 61), and also in the case where, for example, a user inputs an instruction for new creation or change of a map. In the map generation mode, detection frequencies with regard to detected objects are ignored at the time of setting the traveling route for the next cleaning by the route setting part 68, and at least a part of, for example, the entire of the information such as on positions of the detected objects is used to change the traveling route for the next cleaning. In addition, in the map generation mode, the cleaning unit 22 may be made to operate to concurrently perform cleaning during the map generation.

Figure 8A:
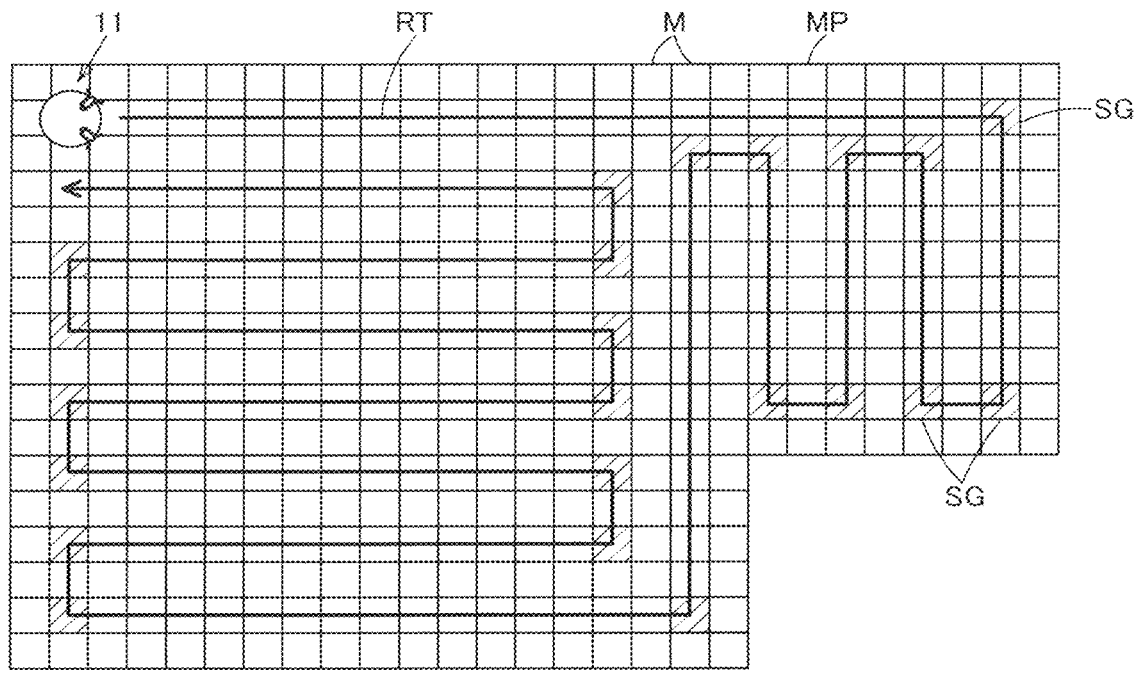
FIG. 8A is an explanatory view showing an example of a stored map.

Specifically, as shown in FIG. 8A as an example, a generated map MP in which a cleaning area (a room) is divided into meshes M each having a specified-sized quadrilateral shape (square shape) or the like is stored in the memory 61 in such a manner that each of the meshes M is associated with the object detected by the obstacle detection part 74 (FIG. 1) and the information acquired by the information acquisition part 75 (FIG. 1). The stored information includes height, material, color tone, shape, temperature, feature points, detection frequency and the like of an object positioned in each of the meshes M. Whether or not any object exists is acquired by the obstacle detection part 74 shown in FIG. 1. The height and shape of an object is acquired by the shape acquisition part 64 based on the images captured by the cameras 51a, 51b. The material and color tone of an object are detected by the discrimination part 66 based on the images captured by the cameras 51a, 51b. The temperature is detected by the temperature sensor 57. The feature points are extracted by the extraction part 65 from the images captured by the cameras 51a, 51b. The map MP is stored at the time of generation in, for example, the memory 61, and is read out from the memory 61 for use at the next cleaning and thereafter. However, in view of cases where even the same cleaning area may be changed in terms of layout of objects or the like, in the present embodiment, the once generated map MP is to be updated from time to time based on distance measurement of an object in the cleaning mode which will be described later. In addition, the map MP may be generated arbitrarily, for example, in response to user's instruction or the like, or may be input in advance by a user without setting of the map generation mode.

Next, the vacuum cleaner 11 generates an optimum traveling route based on the map by use of the control unit (route setting part 68), and performs cleaning while autonomously traveling in the cleaning area along the traveling route (cleaning mode). In the cleaning mode, as for the cleaning unit 22, by use of the electric blower 41, the brush motor 43 (rotary brush 42 (FIG. 3)) or the side brush motor 45 (side brush 44 (FIG. 3)) driven by the control unit (cleaning control part 70), dust and dirt on the floor surface are caught and collected to the dust-collecting unit 46 (FIG. 2) through the suction port 31 (FIG. 3).

Then, in overview, in the autonomous traveling, while making the cleaning unit 22 operate and moving toward a relay point along the traveling route, the vacuum cleaner 11 repeats the operation of acquiring whether or not any object corresponding to an obstacle exists and various types of information by use of the obstacle detection part 74 and the information acquisition part 75, and further periodically estimating the self-position by use of the self-position estimation part 73, and then going through a set relay point. That is, the vacuum cleaner 11 travels so as to sequentially go through preset relay points while performing cleaning. In the case where the map MP shown in FIG. 8A is stored as an example, a traveling route RT is set so that the vacuum cleaner 11 goes straight from a specified start position (for example, the upper left position in the figure) toward a relay point SG, and makes a 90° turn to go straight toward the next relay point SG, and repeats such an operation to perform cleaning.

In this case, the vacuum cleaner 11, when detecting an object, a step gap or the like corresponding to an obstacle before arriving at the next relay point, or when not detecting any object corresponding to an obstacle stored on the map, performs a search motion, taking that the actual cleaning area is different from that of the information on the map.

Figure 8B:
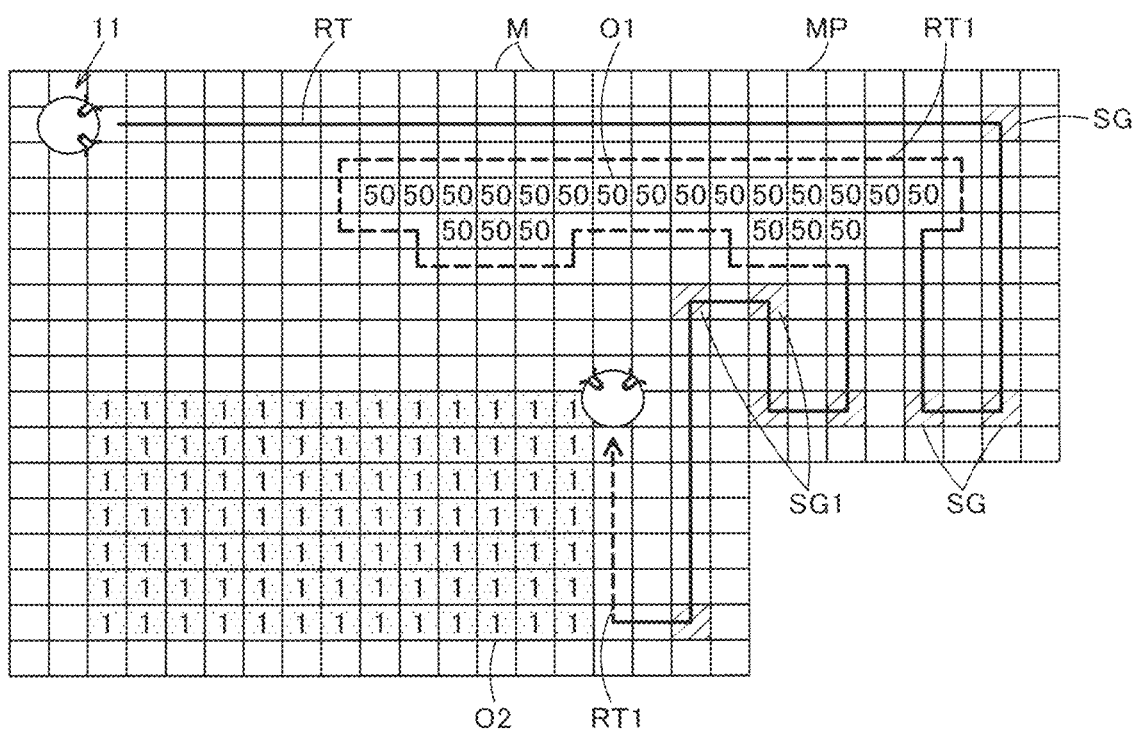
FIG. 8B is an explanatory view showing an example of an operation of a vacuum cleaner in an actual cleaning area.

As shown in FIG. 8B, in the case where objects O1, O2 are detected even when the map MP shown in FIG. 8A is stored, as an example, the vacuum cleaner 11 performs a search motion for searching these objects O1, O2. Specifically, the vacuum cleaner 11 sets a provisional traveling route RT1 (relay point SG1) so as to travel along the periphery of each of these objects O1, O2. That is, if the state of the cleaning area is as shown on the map MP, there is no object corresponding to an obstacle on the traveling route RT between the relay points SG, SG (FIG. 8(a)) since the relay points SG are set on the traveling route RT generated based on the map MP. Accordingly, when an object corresponding to an obstacle is detected, the state of the map MP is found to be different from that of the actual cleaning area. In the search motion of this case, the vacuum cleaner 11 is travel-controlled by the control unit 27 so as to travel while grasping difference by acquiring information by use of the information acquisition part 75 shown in FIG. 1, and thereby the map generation part 67 is capable of reflecting the acquired information on the map when needed.

Further, in the case where any object shown on the map has not been detected by the obstacle detection part 74, the search motion for searching an object in the periphery of the position where any object has not been detected is performed, and thereby the map generation part 67 is capable of accurately reflecting a position of an object corresponding to an obstacle on the map.

Figure 9:
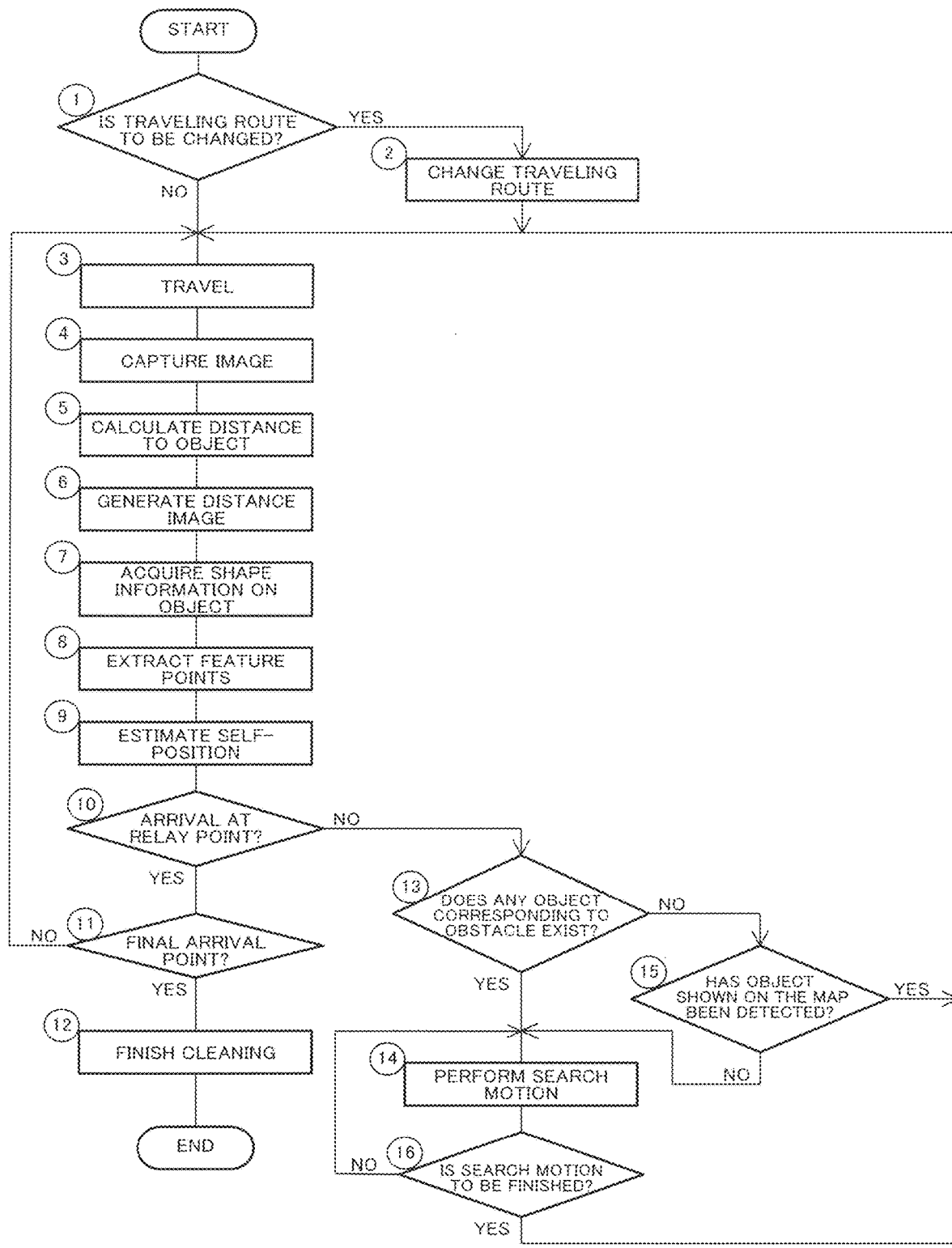
FIG. 9 is a flowchart showing control of the above autonomous traveler.

More detailed description is provided with reference to the flowchart shown in FIG. 9. First, the control unit 27 (route setting part 68) determines whether or not to change the traveling route (step 1). In this case, whether or not to change the traveling route is determined based on, for example, the detection frequency of an object shown on the map. That is, the control unit 27 (route setting part 68) refers to the detection frequency of an object shown on the map. In the case where the detection frequency is a specified level or higher (for example, in the case where the number of times of detection is a specified number of times or more), the control unit 27 changes the traveling route so as to, taking that the object corresponds to the obstacle arranged in the cleaning area in everyday life, set an optimum traveling route to avoid the obstacle (step 2), and the processing goes to step 3 described below. And in step 1, in the case where the detection frequency is below a specified level (for example, in the case where the number of times of detection is below a specified number of times), the control unit 27 does not change the traveling route, taking that the possibility where the obstacle is arranged temporarily cannot be denied, and the processing goes to step 3 described below. In other words, in the case where the number of times of detection indicating how many number of times of cleaning the object corresponding to an obstacle has been detected in a recent specified plural number of times of cleaning is used as the detection frequency as an example, an object which has been detected in a specified plural number of times, for example, three times or more, is used in the change of the traveling route, while other object which has been detected less than three times, that is, an object having been detected the first time or an object having been detected twice is not used in the change of the traveling route.

Then, the control unit 27 (travel control part 69) drives the motors 35, 35 (driving wheels 34, 34 (FIG. 3)) to make the vacuum cleaner 11 (main casing 20 (FIG. 2)) travel along the traveling route (step 3). In this case, a traveling command determined based on the relation between the set traveling route and a self-position, for example, a traveling command for appropriately determining a distance in the case of straight traveling, a swing direction and an angle in the case of swinging (directional change), or the like, is output from the discrimination part 66 to the travel control part 69. Based on the traveling command, the travel control part 69 makes the motors 35, 35 (driving wheels 34, 34 (FIG. 3)) operate.

Then, the cameras 51a, 51b driven by the control unit 27 (image capturing control part 71) capture forward images in the traveling direction (step 4). At least any one of these captured images may be stored in the memory 61. Further, based on these images captured by the cameras Ma, Mb and the distance between the cameras Ma, Mb, the image generation part 63 calculates a distance to an object (feature points) in a specified image range (step 5). Specifically, in the case where the images P1, P2 (for example, FIG. 7A and FIG. 7B) are captured by the cameras 51a, 51b, as an example, the image generation part 63 calculates a distance of each of pixel dots in the images P1, P2 (in the present embodiment, the images processed by the image processing part 62). Further, the image generation part 63 generates a distance image based on the calculated distances (step 6). The distance image may also be stored, for example, in the memory 61. FIG. 7C shows one example of a distance image PL generated by the image generation part 63. Then, from the generated distance image, the shape acquisition part 64 shown in FIG. 1 acquires shape information on an object positioned at a specified distance (or in a specified distance range) (step 7). In this case, shape information on a narrow space or the like may also be acquired through detection of a width dimension, a height dimension and the like as shape information on an object. Also, from the generated distance image, the extraction part 65 extracts feature points (step 8). Then, the self-position estimation part 73 collates the feature points extracted by the extraction part 65 and feature points shown on the map to estimate a self-position (step 9).

Then, the control unit 27 (discrimination part 66) determines, based on the estimated self-position, whether or not the vacuum cleaner 11 has arrived at a relay point (step 10). In step 10, upon determination of having arrived at a relay point, the control unit 27 (discrimination part 66) determines whether or not the present position of the vacuum cleaner 11 is a final arrival point (step 11). In step 11, when the control unit 27 determines that the present position of the vacuum cleaner 11 is not the final arrival point, the processing goes back to step 3. When the control unit 27 determines that the present position of the vacuum cleaner 11 is the final arrival point, the cleaning is finished (step 12). After the cleaning is finished, the control unit 27 (travel control part 69) controls the operation of the motors 35, 35 (driving wheels 34, 34) so that the vacuum cleaner 11 goes back to the charging device 12, and connects the charging terminals 77, 77 (FIG. 3) and terminals-for-charging of the charging device 12 (FIG. 5), and then the control unit 27 is switched over to the standby mode or the charging mode.

On the other hand, in step 10, upon determining that the vacuum cleaner 11 has not arrived at a relay point, the control unit 27 (discrimination part 66) determines, based on the shape information on an object acquired by the shape acquisition part 64, whether or not any object corresponding to an obstacle exists at a specified distance (or in a specified distance range) in front of the vacuum cleaner 11 (main casing 20 (FIG. 2)) (step 13). Specifically, the discrimination part 66 discriminates whether or not at least a part of an object is positioned in a specified image range of the distance image, based on the information on the width dimension and the height dimension of an object and the horizontal or up-and-down distance between the objects acquired by the shape acquisition part 64. The image range corresponds to the external shape (up-and-down and left-and-right sizes) of the vacuum cleaner 11 (main casing 20) in the case where the vacuum cleaner 11 (main casing 20 (FIG. 2)) is positioned at a specified distance D from the cameras 51a, 51b (FIG. 6), or at a specified position in a specified distance range. Accordingly, an object existing at the specified distance D in the image range (FIG. 6) or in a specified distance range means that an obstacle not shown on the map exists on the traveling route connecting relay points each other.

Then, in step 13, upon determining that an object exists, the control unit 27 makes the vacuum cleaner 11 perform the search motion (step 14). The search motion will be described later. In addition, during the search motion, although the cleaning unit 22 may be driven or stopped, the cleaning unit 22 is driven in the present embodiment. Further, in step 13, upon determining that no object exists, the control unit 27 determines whether or not any object corresponding to an obstacle shown on the map has been detected, that is, whether or not any object corresponding to an obstacle shown on the map has disappeared (step 15). In step 15, upon determining that an object has been detected (an object has not disappeared), the processing goes back to step 3, while upon determining that an object has not been detected (an object has disappeared), the processing goes to step 14 for making the vacuum cleaner 11 perform the search motion.

Further, after step 14, the control unit 27 (discrimination part 66) determines whether or not to finish the search motion (step 16). Determination of whether or not to finish the search motion is made based on whether or not the vacuum cleaner 11 has traveled around an object. Then, when the control unit 27 determines that the search motion is not to be finished (the search motion is to be continued), the processing goes back to step 14, while when the control unit 27 determines that the search motion is to be finished, the processing goes back to step 3.

Next, the above-described search motion will be detailed.

In the search motion, the information acquisition part 75 acquires information, while the control unit 27 (travel control part 69) shown in FIG. 1 is controlling the operation of the motors 35, 35 (driving wheels 34, 34 (FIG. 3)) so as to make the vacuum cleaner 11 (main casing 20 (FIG. 2)) travel at a position where there is a difference from the map, such as a position of an object corresponding to an obstacle not shown on the map, an area where an object shown on the map does not exist, or the like. In the case where the obstacle detection part 74 detects an object corresponding to an obstacle, the control unit 27 (travel control part 69) makes the vacuum cleaner 11 (main casing 20 (FIG. 2)) travel along the periphery of the object. In the case where the obstacle detection part 74 does not detect any object shown on the map, the control unit 27 (travel control part 69) makes the vacuum cleaner 11 (main casing 20 (FIG. 2)) travel along, for example, the periphery of the position of the object shown on the map.

Then, the information acquisition part 75 is capable of acquiring, as information on the cleaning area, for example, arrangement position, arrangement range, and a shape such as a width dimension, a height dimension or the like of an object corresponding to an obstacle. These types of acquired information are reflected on the map by the map generation part 67, and respectively associated with detection frequencies and stored in the memory 61. The detection frequencies and various types of information on objects corresponding to obstacles for a specified plural number of times of cleaning as an example are stored in the memory 61.

Here, as for the arrangement position of an object corresponding to an obstacle, the image generation part 63 calculates a distance to an arbitrary object by use of, for example, images captured by the cameras 51*a*, Mb (images image-processed by the image processing part 62) to generate a distance image (parallax image), and thus the discrimination part 66 is capable of determining the arrangement position based on the generated distance image. The arrangement range of an object corresponding to an obstacle can be acquired when the vacuum cleaner 11 travels around the object while detecting the object. Specifically, as shown on the example of the map MP in FIG. 8B, a height dimension is reflected as shape information on an object, and thereby the discrimination part 66 (FIG. 1) is capable of determining that the object O1 having a height equal to a specified height (for example, 50 centimeters) or higher is a large obstacle such as a shelf or the like. That is, the range having a specified height or higher (meshes M indicating 50 in FIG. 8B) is the position different from the stored map. Moreover, the discrimination part 66 (FIG. 1) is capable of determining that an object O2 having a wide and low shape of, for example, approximately 1 centimeter height as shown in FIG. 8B, is a rug or a carpet. That is, the meshes M indicating 1 in FIG. 8B are also the positions different from the stored map.

Further, the shape acquisition part 64 calculates a shape of an object corresponding to an obstacle, such as a width dimension, a height dimension or the like, based on the distance image.

Figure 10:
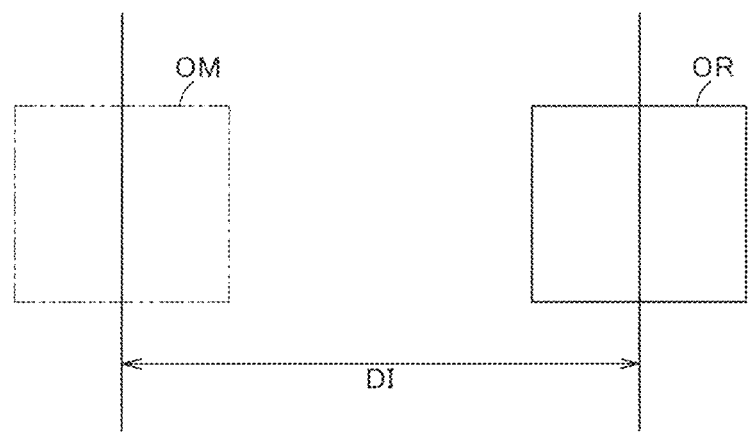
FIG. 10 is an explanatory view schematically showing state where the position of the obstacle stored on the map of the above autonomous traveler and the position of the obstacle detected by obstacle detector are different.

Then, in the case where the object corresponding to an obstacle detected by the obstacle detection part 74 has the same shape or is made of the same material as the object stored in the memory 61, in the case where the object positions at a specified distance (for example, 30 centimeters) or shorter from the object stored in the memory 61 (in the case where a center distance DI between an object OR detected by the obstacle detection part 74 and an object OM stored in the memory 61 is a specified distance or shorter (FIG. 10)), or in the case where the object has the same shape or is made of the same material as the object stored in the memory 61, and further has been detected at a specified distance or shorter from the stored object (in the case where the center distance is a specified distance or shorter), the object corresponding to an obstacle detected by the obstacle detection part 74 is determined as an identical object with the one stored in memory 61, and the detection frequency (the number of times of detection) of the object stored in the memory 61 increases. That is, in the case where the object determined as having the same shape or being made of the same material as the object stored in the memory 61 is detected at substantially the same position, the object can be a fixed object arranged at the position in everyday life. Alternatively, in an example, the object which is not detected at the position stored in the memory 61 but detected at a position where the center distance to the stored object is a specified distance or shorter, can be a semi-fixed object which is arranged in everyday life but arranged variously at different positions, for example, a chair, a sofa or the like. Accordingly, such objects are not determined as objects different from the objects stored in the memory 61, and are preferably used in the determination at the time of traveling route setting with the detection frequency taken over as is stored in the memory 61. In addition, the object detected as being positioned at a specified distance or shorter to the position of an object stored in the memory 61 is preferably stored in the memory 61 as existing at a position shifted on the map by the map generation part 67. Then, the control unit 27 (route setting part 68) changes the traveling route of the main casing 20 based on the map where the arrangement and the detection frequency of the object corresponding to an obstacle are reflected.

As described above, in the case where the object corresponding to an obstacle detected on the traveling route is an object having a high possibility of being arranged temporarily or an object having a high possibility of being detected by accident, for example, a shopping bag, a pet, a human or the like, if the traveling route for the next cleaning of the vacuum cleaner 11 (main casing 20) is changed with respect to each of such objects, an unnecessarily-complicated traveling route may be set to avoid such an object, and further an optimum traveling route can be changed sequentially. Therefore, in the present embodiment, the control unit 27 (route setting part 68) determines whether or not to change the traveling route for the next time based on the object corresponding to an obstacle detected by the obstacle detection part 74 during the traveling mode. This enables to eliminate disturbance elements such as an object having a high possibility of being arranged temporarily, an object having a high possibility of being detected by accident, or the like, set the traveling route more accurately by suppressing unintended change of the traveling route, and thus perform more efficient and more accurate traveling and cleaning in the cleaning area.

Specifically, the control unit 27 (route setting part 68) determines whether or not to change the traveling route for the next time based on the detection frequency stored in the memory 61 with respect to the object corresponding to an obstacle detected by the obstacle detection part 74. This enables to accurately predict the area conditions for the next time based on the detection frequency, resulting in setting an optimum traveling route.

That is, in the case where the obstacle detection part 74 has detected for the first time an object corresponding to an obstacle not shown on the map during the traveling mode (the number of times of detection is one), the control unit 27 (route setting part 68) cannot determine whether the object is arranged in everyday life, or arranged temporarily or by accident. Thus, the control unit 27 (route setting part 68) does not change the traveling route for the next time based on the object. Likewise, in the case where the detection frequency stored in the memory 61 is less than a specified level (the number of times of detection is, for example, 2 or less), the object has a high possibility of being arranged temporarily or by accident. Thus, the control unit 27 (route setting part 68) does not change the traveling route for the next time based on the object. This enables to reduce, as a result, erroneous setting of non-optimum traveling route based on the object having a high possibility of being arranged temporarily or the object having a high possibility of being detected by accident.

Further, during the traveling mode, the control unit 27 (route setting part 68) determines that the object having a specified level or more of the detection frequency (the number of times of detection is, for example, 3 or more) stored in the memory 61, that is, the object detected repeatedly, is an object such as a fixed object or a semi-fixed object arranged in daily life, and changes the traveling route for the next time based on the object, thereby enabling to more accurately set the traveling route.

In particular, the vacuum cleaner 11 for cleaning an area is capable of optimizing the traveling route based on the latest information on the area and further providing optimum and efficient cleaning control, resulting in realizing efficient automatic cleaning.

In addition, in the case where a rate is used as the detection frequency of the object corresponding to an obstacle detected by the obstacle detection part 74, whether or not to change the traveling route is enabled to be statistically determined.

However, during the map generation mode where, while the map generation part 67 is generating a map, the operation of the driving wheels 34, 34 (motors 35, 35) is controlled so that the vacuum cleaner 11 (main casing 20) is made to travel autonomously, the control unit 27 (route setting part 68) sets the traveling route for the next time based on the objects corresponding to obstacles not shown on the map but detected by the obstacle detection part 74 regardless of the detection frequencies of such objects, and thus the map generation mode is applicable in the case where a map is generated newly or in the case where a user instructs updating a map. In particular, in the case where a user instructs updating of the map, the user may clear the area highly possibly and thus it is determined that there is no object arranged temporarily or by accident. Accordingly, the object detected by the obstacle detection part 74 is used preferably as a fixed object or a semi-fixed object at the time of traveling route setting.

In the case where, during the traveling mode, the position of the object shown on the map is different from the position of the object corresponding to an obstacle detected by the obstacle detection part 74, the control unit 27 (route setting part 68) determines these objects as an identical object if the distance between them is a specified distance or shorter. Accordingly, the control unit 27 (route setting part 68) enables to update the position shown on the map, taking over the detection frequency as is of the object stored in the memory 61.

Likewise, the control unit 27 (route setting part 68) determines whether or not the object shown on the map and the object corresponding to an obstacle detected by the obstacle detection part 74 are an identical obstacle based on the shape information on obstacles acquired by the shape acquisition part 64 during the traveling mode. That is, the control unit 27 (route setting part 68) determines the objects having the same shape information as an identical object. Accordingly, the detection frequency of the object stored in the memory 61 is enabled to be taken over as is.

As a result, since the identical object is hardly determined as different objects by mistake, an object corresponding to an obstacle is enabled to be detected more accurately. This allows to suppress the detection frequency from being changed, with respect to a semi-fixed object variously arranged at different positions, for example, a chair of a desk, a sofa or the like. This enables to more accurately set the traveling route and suppress the traveling route from being changed sequentially.

Specifically, the shape acquisition part 64 is capable of easily and accurately acquiring a shape of an object corresponding to an obstacle, by acquiring the shape from a distance image (parallax image) with respect to images captured by the plurality of cameras 51*a*, 51*b*, that is, by use of the cameras 51*a*, 51*b*, the image generation part 63, and the shape acquisition part 64.

When the residual capacity of the secondary battery 28 is a specified level or less (for example, 30% or less) during the traveling mode, the control unit 27 may set the traveling route so as to make the cleaning unit 22 perform cleaning sequentially starting from an object having a higher detection frequency. It is highly possible that the object having a higher detection frequency is a fixed object or a semi-fixed object arranged in everyday life, and thus it is determined that dust and dirt are easily accumulated around such an object. Accordingly, cleaning such objects with priority allows to provide efficient cleaning by effective use of the capacity of the secondary battery 28.

Moreover, when the obstacle detection part 74 detects an object corresponding to an obstacle not shown on the map, a user may be informed of such detection information in such a manner where, in an example, the information is transmitted by the wireless LAN device 47 to the server 16 on the network 15, and then transmitted via electronic mail to the external device 17 carried by a user by use of a mail server, transmitted directly to the external device 17, indicated on an indication part arranged on the vacuum cleaner 11, or other method. In such a case, a user is enabled to be urged to cleanup an object not being arranged in everyday life, thus enabling to enhance user's awareness of a clean room and awareness of cleaning. In addition, in this case, images captured by the cameras 51*a*, 51*b* are designed to be browsed, thereby enabling to inform a user more easily, resulting in providing a user-friendly function.

Further, the information on a detection frequency of an object corresponding to an obstacle is enabled to be set upon an external operation. In this case, a user can arbitrarily set the detection frequency of an obstacle, thus enabling to set a more accurate traveling route.

In addition, the information on the object corresponding to an obstacle detected by the obstacle detection part 74, for example, a detection frequency, is deletable upon an external operation. In this case, when the vacuum cleaner 11 detects, as an object corresponding to an obstacle, an object which is to be cleaned up but is arranged in an area, such information is deletable depending on user's intention on the condition that the object is cleaned up.

Accordingly, information on an area is efficiently transmitted to the vacuum cleaner 11.

In addition, as for the external operation, in an example, an indication part such as a display including an electrostatic capacitance type touch sensor is arranged on the vacuum cleaner 11 (main casing 20), and thus a user can perform inputting on the indication part directly to the vacuum cleaner 11. Alternatively, a user can perform inputting on the external device 17 to the vacuum cleaner 11 with radio signals.

The information acquisition part 75 may also acquire, as information on a cleaning area, at least anyone of material information on a floor surface, step gap information on a floor surface, temperature information on an object, dust-and-dirt amount on a floor surface, and the like, in addition to an arrangement position and a range of an obstacle. That is, the information acquisition part 75 and the discrimination part 66 are capable of respectively acquiring and determining material information on a floor surface, for example, information on hard and flat material such as a wooden floor, soft and shaggy material such as a carpet or a rug, or a tatami mat, and/or color tone information on a floor surface, based on images captured by the cameras 51a, 51b (in the present embodiment, based on images processed by the image processing part 62). Likewise, the step gap information on a floor surface is detectable by the sensor part 26 (step gap sensor 56). The temperature information on an object is detectable by the sensor part 26 (temperature sensor 57). The dust-and-dirt amount is detectable by the sensor part 26 (dust-and-dirt amount sensor 58). Such acquired information is reflected on the map by the map generation part 67 and also available to be stored in the memory 61. Then, based on the various types of information acquired by the information acquisition part 75, the control unit 27 (travel control part 69) sets the travel control with respect to the driving wheels 34, 34 (motors 35, 35), or changes the cleaning control, that is, changes the operations of the cleaning unit 22 (electric blower 41, brush motor 43 (rotary brush 42 (FIG. 3)), and the side brush motors 45, 45 (side brushes 44, 44 (FIG. 3))), as an example, thereby enabling to perform finer cleaning.

Next, a second embodiment will be described with reference to FIG. 11. As for the same configuration and operation as the above-described first embodiment, the same reference number is imparted and its description is omitted.

In the second embodiment, when, in the above-described first embodiment, an object corresponding to an obstacle not shown on the map is detected by the obstacle detection part 74 during when the control unit 27 is in the traveling mode, time information on detection is stored in the memory 61 in addition to the detection frequency thereof.

Here, the time information in the present embodiment refers to, for example, a day of a week and a time zone, and the time zone includes, for example, three time zones of morning time (6:00 to 12:00), daytime (12:00 to 18:00) and nighttime (18:00 to 6:00).

Moreover, a map and a traveling route for each day of a week and each time zone are stored in the memory 61. On each map, a detection frequency of an object corresponding to an obstacle is also stored associated with a day of a week and a time zone.

Then, the control unit 27 (route setting part 68) determines whether or not to change the traveling route for the next time based on the detection frequency and the time information stored in the memory 61. That is, the traveling route is changed only in the case where the detection frequency of an object stored associated with the day of a week and the time zone corresponding to the cleaning time of the next cleaning is a specified level or higher (for example, in the case where the number of times of detection is a specified number of times or more). The reference values (for example, a specified number of times) in determining the detection frequency may be all the same, or may be different for each day of a week or for each time zone.

With reference to FIG. 11, for example, a detection frequency of an object corresponding to an obstacle and whether or not to change the traveling route will be described. With respect to the object shown in FIG. 11, since the detection frequency associated with Monday and the time zone of morning time is 0, the traveling route for the next time is not to be changed at the time of cleaning in this time zone. On the other hand, in an example, since the detection frequency associated with Monday and the time zone of daytime is 3, while the detection frequency associated with the time zone of nighttime is 2, the traveling routs for the next time are to be respectively changed at the time of cleaning in these time zones. Further, since the detection frequency associated with Tuesday and the time zone of morning time is 3, the traveling route for the next time is to be changed at the time of cleaning in this time zone. On the other hands, in an example, the detection frequency associated with Tuesday and the time zone of daytime is 1, while the detection frequency associated with the time zone of nighttime is 0, the traveling routes for the next time are not to be changed at the time of cleaning in these time zones.

As a result, the time zone in which an object is arranged temporarily is enabled to be grasped, and an optimum traveling route is enabled to be maintained and set according to each time zone and each day of a week.

Alternatively, according to the above-described second embodiment, the same time zones are set regardless of a day of a week, but different time zones may be set for each day of a week. In an example, different time zones may be set for weekdays and for weekends. Such setting may be configured to be arbitrarily set by a user.

Further, in each of the above-described embodiments, the information acquisition part 75 may be configured only with, for example, the cameras 51a, 51b and the image generation part 63, while the shape acquisition part 64 or the sensor part 26 is not an essential constituent component. Moreover, the sensor part 26 may include at least any one of the step gap sensor 56, the temperature sensor 57 and the dust-and-dirt amount sensor 58. In addition, the information acquisition part 75 may be configured with any sensor for acquiring the arrangement position and the shape of an object or the like.

Whether or not to change the traveling route may be determined just before the start of cleaning, or whether or not to change the traveling route for the next time may be determined when the cleaning is finished.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

(1) A travel control method for an autonomous traveler, comprising the steps of:

generating a map indicating information on an area having been traveled by a main casing, based on detection of an obstacle and a self-position during traveling of the main casing; and with a traveling mode included for making the main casing autonomously travel along a traveling route set based on the map, determining whether or not to change the traveling route for next time based on the obstacle detected during the traveling mode.

(2) The travel control method for the autonomous traveler according to (1), comprising the steps of:

storing, upon detection of an obstacle not shown on the map during the traveling mode, information indicating a detection frequency of the obstacle in a memory; and determining whether or not to change the traveling route for next time based on the stored detection frequency.

(3) The travel control method for the autonomous traveler according to (2), wherein when the obstacle not shown on the map is first detected during the traveling mode, the traveling route for next time is not to be changed based on the obstacle.

(4) The travel control method for the autonomous traveler according to (2) or (3), comprising the step of:

as for an obstacle having a specified level or higher of the detection frequency stored in the memory during the traveling mode, changing the traveling route for next time based on the obstacle.

(5) The travel control method for the autonomous traveler according to any one of (2) to (4), comprising the step of:

with a map generation mode included for traveling autonomously while generating the map, setting the traveling route for next time based on the detection of the obstacle not shown on the map during the map generation mode.

(6) The travel control method for the autonomous traveler according to any one of (2) to (5), comprising the step of:

setting the traveling route so as to perform cleaning sequentially starting from an obstacle having a higher detection frequency, when a residual amount of a battery is a specified amount or less during the traveling mode.

(7) The travel control method for the autonomous traveler according to any one of (2) to (6), comprising the steps of:

when the obstacle not shown on the map is detected during the traveling mode, storing time information on detection as well as the detection frequency of the obstacle in the memory; and determining whether or not to change the traveling route for next time based on the stored detection frequency and the stored time information.

(8) The travel control method for the autonomous traveler according to any one of (2) to (7), comprising the step of:

when a position of an obstacle shown on the map and a position of the detected obstacle are different from each other during the traveling mode, determining the obstacles as an identical obstacle if a distance between the positions is a specified distance or shorter.

(9) The travel control method for the autonomous traveler according to any one of (2) to (8), comprising the step of:

determining whether or not the obstacle shown on the map and the detected obstacle are an identical obstacle, based on shape information on the obstacle detected during the traveling mode.

(10) The travel control method for the autonomous traveler according to (9), comprising the step of:

acquiring a shape of the obstacle based on a parallax image of the images captured by a plurality of cameras.

(11) The travel control method for the autonomous traveler according to any one of (2) to (10), comprising the step of:

performing informing when the obstacle not shown on the map is detected.

(12) The travel control method for the autonomous traveler according to any one of (2) to (11), wherein the information on the detection frequency of the obstacle is enabled to be set upon an external operation.

(13) The travel control method for the autonomous traveler according to any one of (2) to (12), wherein the information on the detected obstacle is deletable upon the external operation.

The invention claimed is:

1. An autonomous traveler, comprising:
a main casing;
a driving wheel for enabling the main casing to travel;
a self-position estimator, including first circuitry, for estimating a self-position;
an obstacle detector, including second circuitry, for detecting an obstacle outside the main casing;
a map generator, including third circuitry, for generating a map indicating information on an area having been traveled by the main casing, based on detection of the obstacle by the obstacle detector and the self-position estimated by the self-position estimator during traveling of the main casing;
a controller for controlling an operation of the driving wheel to make the main casing autonomously travel, wherein the controller includes a traveling mode for controlling the operation of the driving wheel so as to make the main casing autonomously travel along a traveling route set based on the map, and determines whether or not to change the traveling route for next time based on the obstacle detected by the obstacle detector during the traveling mode;
a memory for storing, upon the detection of the obstacle not shown on the map by the obstacle detector during the traveling mode of the controller, information indicating a detection frequency of the obstacle;
a cleaning unit, including at least one of a blower and/or a brush, for cleaning a cleaning-object part; and
a battery serving as a power source for driving the driving wheel, wherein
when a residual amount of the battery is a specified amount or less during the traveling mode, the controller sets the traveling route so as to make the cleaning unit perform cleaning sequentially starting from the obstacle having a higher detection frequency, and determines whether or not to change the traveling route for next time based on the detection frequency stored by the memory.

2. The autonomous traveler according to claim 1, wherein when the obstacle detector first detects the obstacle not shown on the map during the traveling mode, the controller does not change the traveling route for next time based on the obstacle.

3. The autonomous traveler according to claim 1, wherein as for an obstacle having a specified level or higher of the detection frequency stored by the memory during the traveling mode, the controller changes the traveling route for next time based on the obstacle.

4. The autonomous traveler according to claim 1, wherein the controller includes a map generation mode for controlling the operation of the driving wheel so as to make the main casing autonomously travel while the map generator is generating the map, and sets the traveling route for next time based on the obstacle detected by the obstacle detector but not shown on the map during the map generation mode.

5. The autonomous traveler according to claim 1, wherein when the obstacle detector detects the obstacle not shown on the map during the traveling mode of the controller, the memory stores time information on detection as well as the detection frequency of the obstacle, and the controller determines whether or not to change the traveling route for next time based on the detection frequency and the time information stored by the memory.

6. The autonomous traveler according to claim 1, wherein when a position of an obstacle shown on the map and a position of the obstacle detected by the obstacle detector are different from each other during the traveling mode, the controller determines the obstacles as an identical obstacle if a distance between the positions is a specified distance or shorter.

7. The autonomous traveler according to claim 1, further comprising:
a shape acquisition part, including fourth circuitry, for acquiring shape information on the obstacle detected by the obstacle detector, wherein
the controller determines whether or not the obstacle shown on the map and the obstacle detected by the obstacle detector are air identical obstacle, based on the shape information on the obstacle acquired by the shape acquisition part during the traveling mode.

8. The autonomous traveler according to claim 7, further comprising:
a plurality of units of cameras for capturing images, wherein
the shape acquisition part acquires a shape of the obstacle based on a parallax image of the images captured by the cameras.

9. The autonomous traveler according to claim 1, wherein when the obstacle detector detects the obstacle not shown on the map, informing is performed.

10. The autonomous traveler according to claim 1, wherein
the information on the detection frequency of the obstacle is enabled to be set upon a first external operation.

11. The autonomous traveler according to claim 1, wherein
the information on the obstacle detected by the obstacle detector is deletable upon a second external operation.

12. An autonomous traveler, comprising:
a main casing;
a driving wheel for enabling the main casing to travel;
a self-position estimator, including first circuitry, for estimating a self-position;
an obstacle detector, including second circuitry, for detecting an obstacle outside the main casing;
a map generator, including third circuitry, for generating a map indicating information on an area having been traveled by the main casing, based on detection of the obstacle by the obstacle detector and the self-position estimated by the self-position estimator during traveling of the main casing; and
a controller for controlling an operation of the driving wheel to make the main casing autonomously travel, wherein the controller includes a traveling mode for controlling the operation of the driving wheel so as to make the main casing autonomously travel along a traveling route set based on the map, and determines whether or not to change the traveling route for next time based on the obstacle detected by the obstacle detector during the traveling mode; and
a memory for storing, upon the detection of the obstacle not shown on the map by the obstacle detector during the traveling mode of the controller, time information on detection as well as detection frequency of the obstacle, wherein
the controller determines whether or not to change the traveling route for next time based on the detection frequency and the time information stored by the memory.

13. The autonomous traveler according to claim 12, wherein
when the obstacle detector first detects the obstacle not shown on the map during the traveling mode, the controller does not change the traveling route for next time based on the obstacle.

14. The autonomous traveler according to claim 12, wherein
as for an obstacle having a specified level or higher of the detection frequency stored by the memory during the traveling mode, the controller changes the traveling route for next time based on the obstacle.

15. The autonomous traveler according to claim 12, wherein
the controller includes a map generation mode for controlling the operation of the driving wheel so as to make the main casing autonomously travel while the map generator is generating the map, and sets the traveling route for next time based on the obstacle detected by the obstacle detector but not shown on the map during the map generation mode.

16. The autonomous traveler according to claim 12, wherein
when a position of an obstacle shown on the map and a position of the obstacle detected by the obstacle detector are different from each other during the traveling mode, the controller determines the obstacles as an identical obstacle if a distance between the positions is a specified distance or shorter.

17. The autonomous traveler according to claim 12, further comprising:
a shape acquisition part, including fourth circuitry, for acquiring shape information on the obstacle detected by the obstacle detector, wherein
the controller determines whether or not the obstacle shown on the map and the obstacle detected by the obstacle detector are an identical obstacle, based on the shape information on the obstacle acquired by the shape acquisition part during the traveling mode.

18. The autonomous traveler according to claim 17, further comprising:
a plurality of units of cameras for capturing images, wherein the shape acquisition part acquires a shape of the obstacle based on a parallax image of the images captured by the cameras.

19. The autonomous traveler according to claim 12, wherein
when the obstacle detector detects the obstacle not shown on the map, informing is performed.

20. The autonomous traveler according to claim 12, wherein
the information on the detection frequency of the obstacle is enabled to be set upon a first external operation.

21. The autonomous traveler according to claim 12, wherein
the information on the obstacle detected by the obstacle detector is deletable upon a second external operation.

* * * * *